Patented Oct. 26, 1954

2,692,892

UNITED STATES PATENT OFFICE 2,692,892

HYDROXYPOLYBUTADIENE AND ESTERS THEREOF

John C. Hillyer and Lee O. Edmonds, Bartlesville, Okla., assignors to Phillips Petroleum Company, a corporation of Delaware No Drawing. Application January 2, 1951, Serial No. 204,062

16 Claims. (Cl. 260—461)

This invention relates to hydroxypolydienes and esters thereof. In one embodiment, liquid polybutadiene is hydroxylated by reaction with hydrogen peroxide, or a compound capable of yielding hydrogen peroxide, in the presence of formic acid or the lower alkyl esters thereof for a time and at a temperature sufficient to produce a new and useful product. In another embodiment, liquid polybutadiene is hydroxylated by reaction with hydrogen peroxide in the presence of formic acid as catalyst for a time and at a temperature sufficient to produce hydroxypolybutadiene which ranges from a glassy solid to a viscous liquid. In one specific embodiment, liquid polybutadiene of low molecular weight is hydroxylated by reaction with aqueous hydrogen peroxide in the presence of formic acid as catalyst for a time and at a temperature sufficient to produce hydroxypolybutadiene which is a viscous liquid, and the hydroxypolybutadiene is further reacted with a monobasic organic acid to produce new and useful esters of hydroxypolybutadiene. In another specific embodiment, the hydroxypolybutadiene is partially hydrogenated and then esterified with a phosphorus-containing esterifying agent to produce new and useful phosphorus-containing esters of hydroxypolybutadiene. The discussion, examples, and claims refer to liquid polybutadiene as the starting material for our invention; however, liquid polydienes containing from 4 to 6 carbon atoms in the unpolymerized unit, for example, liquid polyisoprene, are within the scope of our invention.

The products of our invention, i. e., hydroxypolybutadiene and esters thereof, have been found to be particularly useful as plasticizers and tackifiers for natural and synthetic rubber. Other uses for the hydroxypolybutadiene of our invention are as adhesives and additives for drying oils.

An object of our invention is to provide new and useful hydroxylation products of liquid polybutadiene.

Another object of our invention is to provide a new process for the hydroxylation of liquid polybutadiene wherein novel starting materials are employed.

Another object of our invention is to provide a process for the hydroxylation of liquid polybutadiene which produces a product not before known.

Another object of our invention is to produce a new product which is useful as a plasticizer and tackifier for natural and synthetic rubber.

Another object of our invention is to provide a process for the production of esters of hydroxypolybutadiene.

Another object of our invention is to provide a process for the production of esters of partially hydrogenated hydroxypolybutadiene.

Another object of our invention is to provide a process for the production of phosphorus-containing esters of hydroxypolybutadiene.

Another object of our invention is to provide a mixed phosphorus-containing ester of hydroxypolybutadiene.

Another object of our invention is to provide esters of hydroxypolybutadiene which are useful as plasticizers and tackifiers for natural and synthetic rubber.

Another object of our invention is to provide esters of partially hydrogenated hydroxypolybutadiene.

Other objects will be apparent to those skilled in the art upon reading the accompanying discussion and disclosure.

In the practice of one embodiment of our invention, liquid polybutadiene having a molecular weight less than 5000 and preferably less than 2000 and having a viscosity in the range of 100 to 6000, and preferably in the range of 400 to 1400, Saybolt Furol Seconds at 100° F., is hydroxylated by reaction with hydrogen peroxide or a compound capable of yielding hydrogen peroxide, with or without a solvent, in the presence of a catalyst, for example, formic acid, for a time and at a temperature sufficient to yield hydroxypolybutadiene ranging in appearance from a glassy solid to a viscous liquid.

The polybutadiene starting material is characterized by its low molecular weight, less than 5000 and preferably less than 2000 (determined by freezing point lowering in benzene), and its appearance as a pale yellow liquid having a viscosity in the range of 100 to 6000 Saybolt Furol Seconds at 100° F. This material can be prepared by a mass polymerization process conducted in such a manner that a liquid polymer is produced, for example, by sodium catalyzed polymerization of butadiene. One method for the preparation of such a liquid polybutadiene, free from dissolved solids, is fully described in the copending coassigned application of W. W. Crouch, Serial No. 67,098, filed December 23, 1948, the disclosure of which is incorporated herein by reference. We intend to include partially hydrogenated liquid polybutadiene within the meaning of the term liquid polybutadiene when referring to the starting material of our invention.

It is understood that the term "hydrogen peroxide" as used in the specification and claims includes material capable of yielding hydrogen peroxide as well as hydrogen peroxide per se. The hydrogen peroxide is preferably utilized in aqueous solution of a concentration in the range of 3 to 90 weight per cent and preferably in the range of 5 to 40 weight per cent. The mol ratio of $C_4$ units contained in the liquid polybutadiene to hydrogen peroxide in the process of our invention is preferably in the range of 10 to 1 to 0.1 to 1.

The hydroxylation reaction of our invention can be practiced with or without a solvent. Oxygen utilization is generally more efficient and better control of the product is possible when a solvent is used; however, with low concentration of hydrogen peroxide, our reaction can be accomplished without a solvent. Various inert solvents which serve to bring the reactants into intimate contact and permit the reaction to proceed can be used. Examples of solvents suitable for the practice of our invention include normally liquid chlorinated hydrocarbons having a boiling point of not more than 200° C., for example, chloroform, chlorobenzene, carbon tetrachloride, methylene chloride, ethylene chloride, and the like. Vigorous agitation of the reaction mixture is desirable, particularly when no solvent is used.

Catalysts suitable for the hydroxylation reaction of our invention preferably include formic acid and lower alkyl esters thereof, for example, methyl formate, ethyl formate, and propyl formate; however, other hydroxylating catalysts can be used without departing from the spirit and scope of our invention. The catalysts are preferably utilized in equimolar proportions with the hydrogen peroxide; however, mol ratios of catalyst to hydrogen peroxide in the range of 0.75 to 1 to 1.25 to 1 and even in the range of 0.2 to 1 to 2 to 1 can be used in effecting our hydroxylation reaction.

The hydroxylation reaction of our invention is usually carried out at a temperature in the range of 10 to 95° C. and preferably in the range of 25 to 60° C. The time of reaction depends on such factors as temperature of reaction and degree of hydroxylation desired, however the usual reaction time is in the range of 1 to 60 hours and preferably in the range of 6 to 30 hours.

Pressures within a wide range can be used in the practice of our invention and satisfactory results have been obtained at atmospheric pressure. However, when low-boiling catalysts such as methyl formate are used, or when a low-boiling solvent is used, it is desirable to carry out the hydroxylation reaction at a pressure sufficient to maintain the reaction system in a liquid phase at the reaction temperature. Equipment for carrying out the hydroxylation process of our invention is known to those skilled in the art. For example, when the reaction is conducted in the presence of a formic acid catalyst, a glass reactor fitted with a reflux condenser can be used. However, if the reaction is carried out under superatmospheric pressure, as when a methyl formate catalyst is utilized, a pressure reactor, for example, a stainless or glass lined steel autoclave, is preferred.

The nature of the hydroxypolybutadiene product of our invention depends largely upon the extent to which the hydroxylation reaction is carried. The degree or extent of hydroxylation in turn depends on various factors including concentration of the hydrogen peroxide solution, ratio of $C_4$ units contained in the liquid polybutadiene to hydrogen peroxide, and presence or lack of solvent in the reaction mixture. Other factors, for example, time and temperature of reaction, may also affect the reaction and the nature of product produced. In general greater extent of hydroxylation results in less solubility of the hydroxypolybutadiene in paraffin hydrocarbon solvents. Thus, reaction can be carried out such that a white amorphous solid hydroxypolybutadiene product is produced which is insoluble in acetone and paraffinic hydrocarbons. Such a product is highly hydroxylated and probably partially cross-linked. The hydroxylation reaction can also be carried out such that a viscous liquid hydroxypolybutadiene product is produced which is soluble in acetone and paraffinic hydrocarbons indicating that the hydroxylation has proceeded to a relatively slight extent. Reaction conditions can also be controlled so as to produce a solid product of a high degree of hydroxylation which may be partly or completely acetone soluble. Examples of these types of products, their description, and conditions for formation, are listed in Example I. The degree or extent of hydroxylation is in a general way directly proportional to the concentration of the hydrogen peroxide solution utilized in the reaction and inversely proportional to the ratio of $C_4$ units contained in the liquid polybutadiene to hydrogen peroxide charge utilized in the reaction. For concentrations of hydrogen peroxide above about 15 weight per cent, use of a suitable solvent decreases the formation of solid hydroxypolybutadiene product which is insoluble in organic solvents. Temperature of reaction primarily affects the time of reaction rather than nature of product produced.

Thus, by controlling the initial reactant concentrations and ratios, and by using or not using a solvent, a product varying from a solid which is insoluble in organic solvents to a liquid which is soluble in organic solvents can be produced.

The hydroxypolybutadiene product of our invention is insoluble in water and therefore the product, when the reaction is complete, can be separated from any remaining formic acid, hydrogen peroxide, or water-soluble solvent by washing with water. Separation of product can also be accomplished by heating the reacted mixture preferably under reduced pressure so as to drive off water, formic acid, hydrogen peroxide, and solvent, either water-soluble or water-insoluble.

In another embodiment of our invention, esters of hydroxypolybutadiene are prepared by esterifying hydroxypolybutadiene, the hydroxypolybutadiene being prepared according to the first mentioned embodiment of our invention, by reaction with monobasic acids or anhydrides thereof, or with phosphorus-containing esterifying agents; in the latter case a final esterification with a lower aliphatic alcohol is preferred, forming a neutral mixed ester. The hydroxypolybutadiene starting material referred to here includes hydroxypolybutadiene that has been partially esterified in the hydroxylation reaction. Further, the hydroxypolybutadiene starting material is preferably substantially completely soluble in acetone, has a hydroxyl number in the range of 40 to 400, and has a saponification number in the range of 0 to 150.

Acids suitable for preparation of the esters of our invention can be either saturated or unsaturated monobasic aliphatic acids preferably containing not more than 20 carbon atoms, for example, formic, acetic, caproic, caprylic, lauric, myristic, palmitic, stearic, acrylic, decylenic, dodecylenic, and oleic acids or anhydrides thereof; or aromatic acids preferably containing not more than 12 carbon atoms, for example, benzoic and naphthoic acids and alkyl derivatives thereof, for example, 2-methylbenzoic, 3-methylbenzoic, 2-methyl-3-ethylbenzoic, 2-ethyl-4-isobutylbenzoic, 2-methyl-1-naphthoic, 6-methyl-1-naphthoic, and 4-methyl-1-naphthoic acids and the like or anhydrides thereof. When using unsaturated acids in the practice of our invention, a polymerization inhibitor, for example, tertiary butylcatechol, is desirable to retard polymerization of the unsaturated acid itself. When anhydrides are utilized to produce the esters of our invention, we prefer to use a catalyst, particularly when a high degree of esterification is desired. Examples of such esterifying catalysts include pyridine and sodium acetate.

Esterification by reaction of monobasic acids with liquid hydroxypolybutadiene according to our invention can be carried out with or without an inert medium or solvent; however we prefer to use an inert medium or solvent for the reaction since undesirable side reactions are reduced thereby. It is desirable that the inert medium be selected so that all reactants are soluble therein since optimum results are obtained when only one phase is present. We prefer a normally liquid solvent having a boiling point of not more than 200° C. Solvents suitable for the esterification of hydroxypolybutadiene by reaction with monobasic acids according to our invention include chlorinated hydrocarbons, for example, chloroform, carbon tetrachloride, methylene chloride, ethylene dichloride, chlorobenzene, ethers, for examples, dioxane, diethyl ether, diisopropyl ether, dimethyl ether of ethylene glycol, dimethyl ether of diethylene glycol, and aromatic hydrocarbons, for example, benzene, toluene, and xylene. It is also within the scope of our invention to use sufficient esterifying agent, either acid or anhydride, to act as a solvent in the reaction. The solvents can be used alone or in combination when preparing the esters of our invention. The pressure of the esterification reaction of our invention can be chosen within a fairly wide range and it is preferred to operate at atmospheric pressure; however, when a low boiling solvent is used, it is desirable to carry the reaction out at superatmospheric pressure such that the boiling point of the solvent at that pressure is above the optimum esterification temperature for the reaction mixture.

Temperature of esterification of hydroxypolybutadiene by reaction with a monobasic acid is usually chosen in the range of 50 to 200° C. It is preferable to choose a solvent which boils at or above the temperature of reaction; however as has been noted above, the reaction can be carried out under pressure so that the boiling point of the solvent becomes higher than the temperature of reaction. Time of reaction depends on various factors including temperatures of reaction, activity of esterifying acid, degree of esterification desired, solvent used, and in cases where the esterifying agent is an anhydride, the catalyst employed. In general, the reaction is allowed to proceed for a time sufficient to consume all the esterifying agent or until water is no longer evolved under the reaction conditions.

The degree of esterification of hydroxypolybutadiene by reaction with a monobasic acid according to our invention, at any given set of reaction conditions, can be controlled by controlling the ratio of hydroxypolybutadiene to acid, i. e., if less than 100 per cent esterification is desired the ratio is chosen so that all acid is consumed when the reaction is complete; however, if substantially complete esterification is desired, the ratio is chosen so that water is no longer evolved when the reaction is complete (there being some acid remaining in the reaction mixture when the reaction is complete).

Further, the esterification reaction of our invention can be effected in the presence of a single acid or anhydride, or a mixture of acids. Also partial esterification can be effected by one acid and a different acid can be employed to complete the reaction. Generally we prefer to esterify to a lesser extent with high molecular weight acids than with low molecular weight acids; however the properties desired in the product ester determine the extent of esterification and type of esterification agent used.

In a specific embodiment for the preparation of a formic ester of hydroxypolybutadiene, liquid polybutadiene having a molecular weight of not more than 5000 and a viscosity in the range of 100 to 6000 Saybolt Furol Seconds at 100° F. is hydroxylated and esterified by reacting same with aqueous hydrogen peroxide of a concentration in the range of 5 to 40 weight per cent in the presence of an excess of formic acid. The amount of formic acid used in any particular instance depends, among other things, upon the degree of esterification desired, i. e., sufficient acid should be added to catalyze the hydroxylation reaction as well as to esterify the hydroxypolybutadiene formed during the reaction. The reaction is preferably effected in the presence of an inert solvent, for example, chloroform. The mol ratio of $C_4$ units contained in the liquid polybutadiene to the hydrogen peroxide in the reaction mixture is in the range of 10 to 1 to 0.1 to 1. The first stage of the reaction is effected at a temperature in the range of 10° C. to 95° C. for a time in the range of 1 to 60 hours. It is believed that during this first stage, the formic acid acts primarily as a catalyst in the reaction between the liquid polybutadiene and the hydrogen peroxide to form hydroxypolybutadiene, and also simultaneously esterifies a portion of the hydroxypolybutadiene being formed. In the second stage of the reaction, i. e., when the desired degree of hydroxylation has been obtained, the temperature of reaction is increased to a value in the range of 95° C. to 200° C. and the formic acid acts primarily as an esterifying agent. Water is driven off during this second stage and further esterification is effected. Thus, according to the specific embodiment of our invention just described, polybutadiene is hydroxylated and esterified in the presence of a single inert solvent and in the presence of an agent that reacts first primarily as a catalyst and esterifying agent and later primarily as an esterifying agent. This embodiment is particularly advantageous since it provides an integrated process for the production of an ester of polybutadiene from a single group of reactants in a single reactor.

The esters of our invention produced by reaction of hydroxypolybutadiene and monobasic organic acids or their anhydrides range from viscous liquids to hard, brittle solids with high softening points, the viscosity depending to a large extent upon the degree of hydroxylation of the liquid polybutadiene and to a lesser extent upon the degree of esterification. The color of the esters varies from light yellow to reddish brown.

In another embodiment of our invention, hydroxypolybutadiene, prepared according to the above mentioned hydroxylation process, is esterified with a phosphorus-containing esterifying agent. Phosphorus-containing esterifying agents which can be used include phosphorus-oxychloride, phosphorus pentoxide, phosphorus trichloride, phosphorus pentachloride, and orthophosphoric acid. When the esters of our invention are to be used as plasticizers or tackifiers for natural or synthetic rubber, a neutral ester is desirable. In such a case, the acid phosphorus-containing ester prepared by esterifying hydroxypolybutadiene by reaction with say phosphorus oxychloride is further reacted with a low molecular weight aliphatic monohydric alcohol containing not more than 8 carbon atoms to produce a neutral mixed phosphorus-containing ester of hydroxypolybutadiene.

The neutral mixed phosphorus-containing esters of our invention contain one or both of two types of characteristic ester units distributed at intervals in the polybutadiene chain. These ester units can be represented by (1) 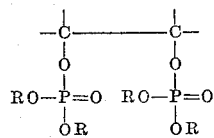

and (2) 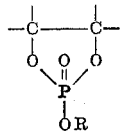

where R is an alkyl group containing not more than 8 carbon atoms. We believe that both types of ester units are present in the esters of our invention with one type or the other predominating depending upon various operating factors and type of esterifying agent used. Operating factors which determine the extent of esterification include ratio of $C_4$ units contained in the liquid polybutadiene to phosphorus-containing esterification agent, temperature of reaction, time of reaction and presence or lack of an inert diluent or solvent medium.

Esterification of liquid hydroxypolybutadiene by reaction with a phosphorus-containing esterifying agent can be effected with or without an inert diluent or solvent medium. We prefer use of a normally liquid inert medium having a boiling point of not more than 200° C. in which all reactants are soluble, for example, chlorinated liquid hydrocarbons including chloroform, carbon tetrachloride, methylene chloride, ethylene chloride, chlorobenzene, ethers, including dioxane, diethyl ether, diisopropyl ether, dimethyl ether of ethylene glycol, dimethyl ether of diethylene glycol, and aromatic hydrocarbons, including benzene, toluene, and xylene, since optimum results are obtained when only one phase is present. The solvent preferably has a boiling point of not more than 200° C. so that the solvent can be readily removed from the mixture upon completion of the reaction. Sufficient solvent is used to dissolve all reactants and satisfactory results have been obtained when a solution containing only one per cent by weight of hydroxypolybutadiene was used.

The hydroxypolybutadiene starting material for the production of the phosphorus-containing esters of our invention is prepared according to the procedure noted above and such hydroxypolybutadiene starting material is preferably substantially completely soluble in acetone, has a hydroxyl number in the range of 40 to 400, and has a saponification number in the range of 0 to 150. It is believed that only a fraction of the double bonds react and two hydroxyl groups are introduced per reacted double bond when liquid polybutadiene is hydroxylated according to our invention.

Hydroxypolybutadiene per se can be used in the preparation of the phosphorus-containing esters or the hydroxypolybutadiene can be partially hydrogenated before esterification and thereby reduce any tendency toward cross-linking or polymerization during the esterification reaction. It is within the scope of our invention to partially hydrogenate the liquid polybutadiene starting material before hydroxylation, as well as to hydrogenate after hydroxylation, when it is desired to esterify hydrogenated hydroxypolybutadiene. Unhydrogenated hydroxypolybutadiene can be esterified with the phosphorus-containing esterification agents in the presence of a basic material, for example, pyridine or its homologues or dimethyl-aniline, which will react with acid formed during the esterification reaction and thereby reduce cross-linking or polymerization during the esterification reaction.

As was previously noted, hydrogenated hydroxypolybutadiene can be prepared by hydrogenation of hydroxypolybutadiene or by partial hydrogenation of liquid polybutadiene followed by hydroxylation according to the process of our invention, the former method being preferred. The hydrogenation reaction can be carried out with or without an inert solvent medium. We prefer to utilize a solvent in which both the material being hydrogenated (polybutadiene or hydroxypolybutadiene as the case may be) and the hydrogenated product are soluble. Solvents which can be used include dioxane, dimethyl ether of ethylene glycol, and dimethyl ether of diethylene glycol. The solvent preferably has a boiling point not greater than 200° C. to facilitate its removal when the hydrogenation reaction is complete. Hydrogenation catalysts applicable for the hydrogenation reaction include nickel on kieselguhr, Raney nickel, platinum, cobalt, and palladium on charcoal. The hydrogenation reaction is preferably carried out at a temperature in the range of 20 to 200° C. and a pressure in the range of 20 to 2000 p. s. i. g. In the case of hydrogenation of hydroxypolybutadiene the reaction can be continued, if desired, until as much as 90 per cent of the double bonds originally present in the liquid polybutadiene have been reacted to add either hydroxyl groups or hydrogen thereby producing hydrogenated hydroxypolybutadiene with a degree of unsaturation in the range of 0 to 10 per cent. Such a high degree of saturation greatly reduces the tendency toward cross-linking or polymerization during the subsequent esterification reaction.

We prefer to effect our esterification reaction by the phosphorus-containing esterifying agents and any further reaction with an alcohol to produce a neutral mixed ester under an inert atmosphere. Such atmosphere can be provided by use of a suitable inert gas, for example, nitrogen, or by choosing a solvent in each case which boils at the reaction temperature.

The course of esterification can be followed by sampling the reaction mixture during the reaction and analyzing to determine the degree to which the acid groups have been esterified. In this way, the reaction can be stopped when esterification has proceeded to such an extent that a product of desired properties is produced.

In a specific embodiment of our invention, a neutral mixed phosphorus-containing ester is preferably produced by reaction of hydrogenated liquid hydroxypolybutadiene with phosphorus oxychloride and further reaction of the acid ester so produced with a low molecular weight aliphatic monohydric alcohol, for example, butanol, to yield a product which is a neutral mixed phosphorus-containing ester of hydroxypolybutadiene. The amount of phosphorus oxychloride, expressed in terms of the ratio acid equivalents contained in the phosphorus oxychloride to hydroxyl equivalents contained in the hydroxypolybutadiene, is chosen in the range of 0.33 to 1 to 3 to 1. The acid phosphorus-containing ester is preferably neutralized by reaction with a low molecular weight monohydric aliphatic alcohol, for example, butanol, at a temperature in the range of minus 20 to 100° C. for a time in the range of 1 to 24 hours so as to produce a neutral mixed phosphorus-containing ester of hydroxypolybutadiene which is useful as a plasticizer or tackifier in natural and synthetic rubber.

The neutral mixed phosphorus-containing esters produced according to our invention vary in nature from viscous liquids to stiff, plastic materials and in color from yellow to black.

The esters of our invention have been described as preferably being produced from liquid hydroxypolybutadiene; however we do not intend to be limited to liquid hydroxypolybutadiene but intend to include esters produced from the solid hydroxypolybutadiene of our invention.

It is understood that conditions of temperature and time of reaction, ratio of reactants, ratio of acid equivalents to hydroxyl equivalents, degree of dilution, presence or lack of solvents, and the like will depend upon factors including degree and type of ester desired, esterifying agent used, and nature of the starting liquid polybutadiene; therefore we do not intend to be limited by the specific conditions and examples herein set forth as we intend to illustrate and not limit our invention thereby.

Our invention can be more fully understood by applying the following illustrative examples to the discussion and disclosure herein set forth.

EXAMPLE I

Liquid polybutadiene, prepared by sodium catalyzed polymerization of butadiene and having a viscosity of 418 Saybolt Furol Seconds at 100° F. and a molecular weight of 835 (determined by freezing point lowering of benzene), was hydroxylated in a series of runs using various amounts of a mixture containing equimolar quantites of hydrogen peroxide and formic acid. The runs were carried out in a glass reactor which was fitted with a reflux condenser. The reaction mixture was stirred throughout the reaction and the product recovered by washing with water. The time of reaction in the runs varied from 24 to 30 hours. Details of the runs as to concentration and ratio of reactants and temperature of reaction are given in the table below together with the products obtained.

*Hydroxylation of polybutadiene*

| Run No. | A | B | C | D | E | F | G |
|---|---|---|---|---|---|---|---|
| Mols $C_4H_6$ Units/Mol $H_2O_2$ | 1 | 0.5 | 1 | 1 | 1 | 1 | 1 |
| Temperature, °C | [2] 50 | [2] 50 | 50 | 50 | 50 | 50 | 50 |
| Concentration aqueous $H_2O_2$, weight percent | 10 | 28 | 28 | 10 | 20 | 20 | 29 |
| Solvent | | | | | | $CHCl_3$ | $CHCl_3$ |
| Parts by weight of solvent/part polybutadiene | 0 | 0 | 0 | 0 | 0 | 8 | 8 |
| Reaction time, hours | 22 | | 8 | 48 | 10 | 48 | 48 |
| Unconsumed $H_2O_2$, weight percent (based on $H_2O_2$ originally present) | 20 | | 30 | 20 | 20 | 10 | 0 |
| Product solubility, weight percent: | | | | | | | |
| Insoluble in acetone | | | | | 72 | | |
| Acetone soluble | [3] 100 | [3] 100 | 70 | 30 | 100 | 28 | 100 | 100 |
| Acetone soluble and pentane insoluble | | | | 28 | 77 | | 27 | 99 |
| Acetone soluble and pentane soluble [1] | | | | 2 | | 23 | 1 | 1 |
| Product analysis, weight percent: | | | | | | | |
| C | 80.1 | | 70.2 | 80.0 | 83.0 | 70.2 | 70.0 | 71.4 | 68.4 |
| H | 9.9 | | 9.4 | 10.1 | 10.3 | 9.1 | 9.3 | 9.1 | 8.9 |
| O | 10.0 | | 20.4 | 9.9 | 6.7 | 20.7 | 20.7 | 19.3 | 21.2 |
| Hydroxyl number | 285 | | 334 | | | | 299 | 357 | 390 |
| Saponification number | 43 | | 65 | | | | 97 | 85 | 120 |
| Calculated product analysis, weight percent: | | | | | | | |
| OH | 2.61 | | 10.15 | 5.48 | | | 9.03 | 10.82 | 11.80 |
| OOCH | | | 5.21 | 2.41 | | | 7.77 | 6.81 | 9.61 |
| OH in OOCH | | | 1.97 | 0.91 | | | 2.93 | 2.58 | 3.63 |
| Total OH | | | 12.12 | 6.39 | | | 11.99 | 13.40 | 15.43 |
| O in OH and OOCH | | | 13.27 | 6.89 | | | 14.04 | 15.08 | 17.94 |
| Percent hydroxylated | 15.6 | | 19.0 | 9.5 | | | 17.3 | 21 | 24 |
| Percent formoxylated | 2.4 | | 3.7 | 1.5 | | | 5.6 | 5 | 7 |
| Hydroxy groups/$C_4H_6$ unit | 0.31 | | | 0.19 | | | | 0.42 | 0.48 |
| Formoxy groups/$C_4H_6$ unit | 0.05 | | | 0.03 | | | | 0.10 | 0.14 |
| Percent unsaturated | | | | | | | | | |
| Refractive index $N^{25}$ | | | | | | | | | |
| Softening point | | | | | | | | | |
| SFS viscosity at 210° F | | | | | | | | | >212° F. |
| Description | (4) | (5) | (5) | (6) | (4) | (4) | (7) | (6) | (6) | (8) | (9) |

See footnotes at end of table.

| Run No. | H | I | J | K | L | M | N |
|---|---|---|---|---|---|---|---|
| Mols C₄H₆ Units/Mol H₂O₂ | 1 | 2 | 4 | 4 | 8 | 1 | 1 |
| Temperature, °C | 50 | 50 | 50 | 50 | 50 | 50 | 50 |
| Concentration aqueous H₂O₂, weight percent | 10 | 10 | 10 | 29 | 29 | 10 | 29 |
| Solvent | | | | CHCl₃ | CHCl₃ | | C₆H₅Cl |
| Parts by weight of solvent/part polybutadiene | 0 | 0 | 0 | 8 | 8 | 0 | 8 |
| Reaction time, hours | 48 | 30 | 48 | 24 | 24 | 30 | — |
| Unconsumed H₂O₂, weight percent (based on H₂O₂ originally present) | 25 | 0 | 0 | 0 | 0 | 30 | — |
| Product solubility, weight percent: | | | | | | | |
| Insoluble in acetone | | | | | | | |
| Acetone soluble | | 100 | 100 | 100 | 100 | 100 | 100 |
| Acetone soluble and pentane insoluble | 97 | 79 | — | 55 | — | 45 | — |
| Acetone soluble and pentane soluble¹ | 3 | 21 | 100 | — | 100 | 100 | — |
| Product analysis, weight percent: | | | | | | | |
| C | 78.5 | 79.1 | 81.7 | 83.2 / 81.2 | 82.1 | 84.7 | 79.7 |
| H | 9.9 | 9.9 | 10.1 | 10.3 / 10.2 | 10.3 | 10.5 | 10.0 |
| O | 11.6 | 11.0 | 7.2 | 6.5 / 8.6 | 7.6 | 4.8 | 10.3 / 21.2 |
| Hydroxyl number | 265 | 217 | 156 | 152 / 186 | 165 | 96 / 284 | 331 |
| Saponification number | 27 | 31 | 11.5 | 13 / 28.1 | 19.3 | 14.8 / 40 | 64.8 |
| Calculated product analysis, weight percent: | | | | | | | |
| OH | 8.04 | 6.58 | 4.74 | 4.61 / 5.64 | 5.00 | 2.91 | 8.59 |
| OOCH | 2.25 | 2.49 | 0.92 | 1.04 / 2.25 | 1.54 | 1.19 | — |
| OH in OOCH | 0.85 | 0.94 | 0.35 | 0.39 / 0.85 | 0.58 | 0.45 / 1.20 | — |
| Total OH | 8.89 | 7.52 | 5.09 | 5.00 / 6.49 | 5.58 | 3.36 / 9.79 | — |
| O in OH and OOCH | 9.11 | 7.97 | 5.12 | 5.08 / 6.90 | 5.80 | 3.58 | — |
| Percent hydroxylated | 14.2 | 11.4 | 8.0 | 7.8 / 9.7 | 8.5 | 8.0 / 15 | 18.8 |
| Percent formoxylated | 1.5 | 1.6 | 0.6 | 0.8 / 1.5 | 1.1 | 0.7 / 2 | 3.7 |
| Hydroxy groups/C₄H₆ unit | 0.284 | 0.228 | 0.16 | 0.156 / 0.194 | 0.17 | 0.16 / 0.30 | 0.376 |
| Formoxy groups/C₄H₆ unit | 0.03 | 0.032 | 0.012 | 0.016 / 0.03 | 0.022 | 0.014 / 0.04 | 0.074 |
| Percent unsaturated | | | | 63.5 | | 66.2 / 54.7 | |
| Refractive index N²⁵ | 1.5120 | 1.5170 | 1.5074 | 1.5130 / 1.5155 | 1.5110 | 1.5142 / 1.5140 | — |
| Softening point | | | | <40° F. | | <40° F. / 65° F. | |
| SFS viscosity at 210° F | | | | | | 500 | |
| Description | (⁶) | (⁶) | (⁶) | (⁴) / (⁶) | (⁶) | (⁶) / (⁶) | (⁶) |

¹ The pentane soluble portion was obtained by treating the acetone soluble portion, acetone removed therefrom, with pentane. Visual observation showed the pentane soluble portion to be generally less viscous than the acetone soluble portion.
² Momentary temperature rises to 65° C. in run A and 86° C. in run B were encountered due to the exothermic nature of the reaction. The reactor was immediately cooled back to 50° C., however, and the reaction completed at that level.
³ Further solubility not determined.
⁴ Pale straw, viscous liquid.
⁵ White amorphous solid.
⁶ Viscous liquid.
⁷ White amorphous solid, swelled by many solvents.
⁸ Pale straw, solid at room temperature.
⁹ Pale straw, tough solid at room temperature.

EXAMPLE II

Two esters, acetate (run (1)) and oleate (run (2)), of liquid hydroxypolybutadiene were prepared from the product of run M, Example I. Conditions of esterification, reactants, and product produced are listed below.

(1) Hydroxypolybutadiene (100 grams) was dissolved in 500 cc. benzene and charged to a reactor together with 129 cc. acetic anhydride and 1 gram fused sodium acetate. The mixture was refluxed 4 hours and allowed to stand overnight. It was then poured into water and the water-insoluble portion washed successively with water, potassium carbonate solution, and water, and dried. Benzene was removed in vacuo at 90° C. The product was a clear, yellow, viscous material with a hydroxyl number of 110 and a saponification number of 140.

(2) Hydroxypolybutadiene (100 grams) and 35 grams oleic acid (sufficient to give one equivalent of acid to four equivalents of hydroxyl) were charged to a reactor and the mixture heated 2 hours at 200° C. at 45 mm. pressure. The product was a brownish-yellow, soft, slightly tacky, spongy material.

EXAMPLE III

Liquid hydroxypolybutadiene was prepared as follows:

|   | Pounds |
|---|---|
| Liquid polybutadiene | 2.5 |
| Chloroform | 20 |
| Formic acid | 2.13 |
| Hydrogen peroxide, 29.8% | 5.21 |

The mixture was stirred and heated to 120° F. for 22 hours and then allowed to stand at room temperature until phase separation occurred. The aqueous phase was removed and the chloroform phase washed with water to remove formic acid. The chloroform was then stripped and the hydroxypolybutadiene recovered. Analysis gave the following results:

| | |
|---|---|
| Hydroxyl No | 320 |
| Saponification No | 145 |
| Carbon percent | 67.6 |
| Hydrogen do | 9.1 |
| Chlorine¹ do | 1.3 |

¹ Probably present as an impurity.

Esterification of the hydroxypolybutadiene was effected by charging 100 grams of hydroxypolybutadiene, 350 cc. acetic anhydride, and 5 cc. pyridine to a reactor and agitating the mixture at 80° C. for 4 hours. Excess acetic anhydride and pyridine were removed in vacuo, and benzene was then added to facilitate removal of the remaining amounts of these materials. Chloroform was then added to dissolve the ester and the solution was dropped into boiling water. A white flocculent solid resulted which was separated from part of the water by centrifugation. The hydrated material was dried in a vacuum desiccator. A light yellow resin, softer than the hydroxypolybutadiene from which it was prepared, was obtained. Analysis gave the following results:

| | |
|---|---|
| Hydroxyl No | 30 |
| Saponification No | 344 |
| Carbon percent | 65.2 |
| Hydrogen do | 8.6 |
| Chlorine¹ do | 0.3 |

¹ Probably present as an impurity.

EXAMPLE IV

A sample of hydroxypolybutadiene (75 grams), prepared according to Run M in Example I, was warmed slowly to reflux with 100 cc. chloroform and 30 grams formic acid and then cooled slowly (about 1 hour) to 50° C. The solvent was removed in vacuo. The formic acid ester obtained was a brownish liquid more viscous than the hydroxypolybutadiene from which it was prepared. The ester had a saponification number of 138 and an acid number of 14.

EXAMPLE V

One hundred grams of hydroxypolybutadiene, prepared according to Run M, Example I, was dissolved in 400 cc. purified dioxane and hydrogenated in the presence of a catalyst comprising 0.5 gram palladium on charcoal and under a hydrogen pressure of 900 p. s. i. g. Hydrogenation was continued for 16 hours, i. e., until no further drop in pressure occurred. The catalyst was removed by filtration and the dioxane removed by stripping.

Sixty grams of hydrogenated hydroxypolybutadiene was charged to a reactor together with one liter of diethyl ether and 47 grams of phosphorus oxychloride. The mixture was refluxed in an atmosphere of nitrogen for 24 hours and then stirred at room temperature for 64 hours. Butanol (45 grams) was then added dropwise while the temperature was held at −5 to +5° C. The reaction mixture was stirred for 16 hours at room temperature. Ether was stripped from the resulting homogeneous mixture, the last portions being removed under vacuum. The product was a dark colored, viscous liquid which upon analysis gave the following results:

|   | Found | Calculated (for complete esterification based on type 1) |
|---|---|---|
|   | Percent | Percent |
| C | 53.8 | 64.2 |
| H | 9.3 | 10.9 |
| Cl | 3.5 | 0.0 |
| P | 7.6 | 7.7 |

EXAMPLE VI 200 grams of hydroxypolybutadiene prepared according to Run M, Example I, was charged to a reactor together with two liters of diethyl ether and 153 grams of phosphorus oxychloride. The mixture was refluxed in an atmosphere of nitrogen for one week at a temperature of 35° C. 148 grams of butanol and 120 grams of pyridine were then added dropwise and the mixture cooled to a temperature in the range of −5 to +5° C. The mixture was then filtered and the filtrate washed and ether evaporated therefrom under vacuo. The product was a black viscous liquid which upon analysis gave the following results:

|   | Found | Calculated (for complete esterification based on type 1) |
|---|---|---|
|   | Percent | Percent |
| C | 62.4 | 64.2 |
| H | 9.0 | 10.9 |
| P | 5.4 | 7.7 |

The foregoing examples are for purposes of illustration of our invention and we do not desire to be unduly limited thereby, but desire to be limited only by the following claims.

We claim:

1. A process for the production of hydroxypolybutadiene which comprises reacting a liquid polybutadiene having a molecular weight of not more than 5000 and a viscosity in the range of 100 to 6000 Saybolt Furol Seconds at 100° F. with aqueous hydrogen peroxide in the presence of a catalyst selected from the group consisting of formic acid, methyl formate, ethyl formate and propyl formate, at a temperature in the range of 10° C. to 95° C. for a time in the range of 1 to 60 hours, the mol ratio of $C_4$ units contained in said liquid polybutadiene to said hydrogen peroxide being in the range of 10 to 1 to 0.1 to 1, the mol ratio of said catalyst to said hydrogen peroxide being in the range of 0.2 to 1 to 2 to 1, the concentration of said aqueous hydrogen peroxide being in the range of 3 to 90 weight per cent.

2. A process for the production of hydroxypolybutadiene which comprises hydroxylating liquid polybutadiene having a molecular weight of not more than 2000 and a viscosity in the range of 400 to 1400 Saybolt Furol Seconds at 100° F. with aqueous hydrogen peroxide in the presence of formic acid at a temperature in the range of 25° C. to 60° C. for a time in the range of 6 to 30 hours, the mol ratio of $C_4$ units contained in said liquid polybutadiene to said hydrogen peroxide being in the range of 10 to 1 to 0.1 to 1, the mol ratio of said formic acid to said hydrogen peroxide being in the range of 0.75 to 1 to 1.25 to 1, said aqueous hydrogen peroxide being of a concentration in the range of 5 to 40 weight per cent, said hydroxylating being effected in a chloroform solvent present in sufficient quantity to dissolve said liquid polybutadiene, hydrogen peroxide, and formic acid, and recovering hydroxypolybutadiene as a product of said hydroxylating.

3. A process for the production of an ester of hydroxypolybutadiene which comprises hydroxylating liquid polybutadiene having a molecular weight of not more than 5000 and a viscosity in the range of 100 to 6000 Saybolt Furol Seconds at 100° F. by reacting same with aqueous hydrogen peroxide in the presence of a catalyst selected from the group consisting of formic acid, methyl formate, ethyl formate, and propyl formate, at a temperature in the range of 10° to 95° C. for a time in the range of 1 to 60 hours, the mol ratio of $C_4$ units contained in said liquid polybutadiene to said hydrogen peroxide being in the range of 10 to 1 to 0.1 to 1, the mol ratio of said catalyst to said hydrogen peroxide being in the range of 0.2 to 1 to 2 to 1, the concentration of said aqueous hydrogen peroxide being in the range of 3 to 90 weight per cent, recovering liquid hydroxypolybutadiene as product of said hydroxylating, esterifying said liquid hydroxypolybutadiene by reacting same with a monobasic aliphatic acid containing not more than 20 carbon atoms at a temperature in the range of 50° to 200° C. for a time sufficient to produce an ester of hydroxypolybutadiene ranging from a viscous liquid to a hard, brittle solid, said esterifying being effected in the presence of an inert solvent having a boiling point of not more than 200° C., and recovering said ester of hydroxypolybutadiene as product of said esterifying.

4. A process for the production of an ester of hydroxypolybutadiene which comprises hydroxylating liquid polybutadiene having a molecular weight of not more than 5000 and a viscosity in the range of 100 to 6000 Saybolt Furol Seconds at 100° F. by reacting same with aqueous hydrogen peroxide in the presence of a catalyst selected from the group consisting of formic acid, methyl formate, ethyl formate and propyl formate, at a temperature in the range of 10° to 95° C. for a time in the range of 1 to 60 hours, the mol ratio of C₄ units contained in said liquid polybutadiene to said hydrogen peroxide being in the range of 10 to 1 to 0.1 to 1, the mol ratio of said catalyst to said hydrogen peroxide being in the range of 0.2 to 1 to 2 to 1, the concentration of said aqueous hydrogen peroxide being in the range of 3 to 90 weight per cent, recovering hydroxypolybutadiene as product of said hydroxylating, esterifying said hydroxypolybutadiene by reacting same with a phosphorus-containing esterifying agent selected from the group consisting of phosphorus oxychloride, phosphorus pentoxide, phosphorus trichloride and phosphorus pentachloride, at a temperature and for a time sufficient to produce a phosphorus-containing ester of hydroxypolybutadiene ranging from a viscous liquid to a stiff, plastic ester, the ratio of the acid equivalent contained in said phosphorus-containing esterifying agent to hydroxyl equivalent contained in said hydroxypolybutadiene being in the range of 0.2 to 1 to 5 to 1.

5. A process for the production of an ester of hydroxypolybutadiene which comprises hydroxylating liquid polybutadiene having a molecular weight of not more than 5000 and a viscosity in the range of 100 to 6000 Saybolt Furol Seconds at 100° F. by reacting same with aqueous hydrogen peroxide in the presence of a catalyst selected from the group consisting of formic acid, methyl formate, ethyl formate and propyl formate, at a temperature in the range of 10° to 95° C. for a time in the range of 1 to 60 hours, said aqueous hydrogen peroxide being of a concentration in the range of 3 to 90 weight per cent, the mol ratio of C₄ units contained in said liquid polybutadiene to said hydrogen peroxide being in the range of 10 to 1 to 0.1 to 1, the mol ratio of said catalyst to said hydrogen peroxide being in the range of 0.2 to 1 to 2 to 1, recovering liquid hydroxypolybutadiene as product of said hydroxylating, hydrogenating said liquid hydroxypolybutadiene at a temperature in the range of 20 to 200° C. at a pressure in the range of 20 to 2000 pounds per square inch gage in the presence of a hydrogenating catalyst and in an inert solvent having a boiling point not greater than 200° C., recovering hydrogenated hydroxypolybutadiene as product of said hydrogenating, esterifying same with a phosphorus-containing esterifying agent selected from the group consisting of phosphorus oxychloride, phosphorus pentoxide, phosphorus trichloride and phosphorus pentachloride, at a temperature and for a time sufficient to produce a phosphorus-containing ester of hydroxypolybutadiene, said esterifying being effected in the presence of an inert solvent, and recovering a phosphorus-containing ester of hydroxypolybutadiene which ranges from a stiff plastic to a viscous liquid.

6. A process for the production of an ester of hydroxypolybutadiene which comprises hydroxylating liquid polybutadiene having a molecular weight of not more than 2000 and a viscosity in the range of 400 to 1400 Saybolt Furol Seconds at 100° F. by reacting same with aqueous hydrogen peroxide in the presence of formic acid at a temperature in the range of 25° to 60° C. for a time in the range of 6 to 30 hours, said aqueous hydrogen peroxide being of a concentration in the range of 5 to 40 weight per cent, the mol ratio of C₄ units contained in said liquid polybutadiene to said hydrogen peroxide being in the range of 10 to 1 to 0.1 to 1, the mol ratio of said formic acid to said hydrogen peroxide being in the range of 0.75 to 1 to 1.25 to 1, recovering liquid hydroxypolybutadiene having a hydroxyl number in the range of 40 to 400 and a saponification number in the range of 0 to 150 as product of said hydroxylating, hydrogenating said liquid hydroxypolybutadiene at a temperature in the range of 20 to 200° C. at a pressure in the range of 20 to 2000 pounds per square inch gage in the presence of a hydrogenating catalyst and in the presence of an inert solvent which boils at a temperature of not more than 200° C., recovering hydrogenated liquid hydroxypolybutadiene as product of said hydrogenating, esterifying same by reacting with phosphorus oxychloride at a temperature in the range of 20° to 150° C. for a time in the range of 1 to 72 hours in the presence of an inert solvent, and reacting a resulting acid phosphorus-containing ester of hydroxypolybutadiene with a low molecular weight monohydric aliphatic alcohol at a temperature in the range of −20° to 100° C. for a time in the range of 1 to 24 hours under an inert atmosphere so as to produce a neutral mixed phosphorus-containing ester of hydroxypolybutadiene.

7. A composition of matter which comprises hydroxypolybutadiene produced by reacting liquid polybutadiene having a molecular weight of not more than 5000 and a viscosity in the range of 100 to 6000 Saybolt Furol Seconds at 100° F. with aqueous hydrogen peroxide in the presence of a catalyst chosen from the group consisting of formic acid, methyl formate, ethyl formate, and propyl formate, at a temperature in the range of 10° to 95° C. for a time in the range of 1 to 60 hours such that hydroxypolybutadiene ranging from a viscous liquid to a white amorphous solid is produced.

8. The process of claim 1 in which the reaction is effected in a chlorinated liquid hydrocarbon solvent having a boiling point of not more than 200° C., and at a pressure sufficient to maintain the reactants substantially in a liquid phase.

9. A process according to claim 8 wherein said solvent is chloroform.

10. A process according to claim 8 wherein said solvent is chlorobenzene.

11. A process for the production of hydrogenated hydroxypolybutadiene which comprises hydroxylating liquid polybutadiene having a molecular weight of not more than 5000 and a viscosity in the range of 100 to 6000 Saybolt Furol Seconds at 100° F. by reacting same with aqueous hydrogen peroxide in the presence of a catalyst selected from the group consisting of formic acid, methyl formate, ethyl formate and propyl formate, at a temperature in the range of 10° to 95° C. for a time in the range of 1 to 60 hours, the mol ratio of C₄ units contained in said liquid polybutadiene to said hydrogen peroxide being in the range of 10 to 1 to 0.1 to 1, the mol ratio of said catalyst to said hydrogen peroxide being in the range of 0.2 to 1 to 2 to 1, the concentration of said aqueous hydrogen peroxide being in the range of 3 to 90 weight per cent; recovering liquid hydroxypolybutadiene as a product of said hydroxylating; and hydrogenating said liquid hydroxypolybutadiene at a temperature in the range of 20 to 200° C. at a pressure in the range of 20 to 2000 pounds per square inch gage in the presence of a hydrogenating catalyst and in an inert solvent having a boiling point not greater than 200° C.

12. A composition of matter comprising hydrogenated hydroxypolybutadiene produced in accordance with the process of claim 11.

13. A composition of matter comprising an ester of hydroxypolybutadiene produced in accordance with the process of claim 3.

14. A composition of matter comprising an ester of hydroxypolybutadiene produced in accordance with the process of claim 4.

15. A composition of matter comprising an ester of hydroxypolybutadiene produced in accordance with the process of claim 5.

16. A composition of matter comprising an ester of hydroxypolybutadiene produced in accordance with the process of claim 6.

References Cited in the file of this patent

UNITED STATES PATENTS

| Number | Name | Date |
|---|---|---|
| 1,963,108 | Werntz | June 19, 1934 |
| 2,456,525 | Mills | Dec. 14, 1948 |
| 2,495,108 | Kosolapoff | Jan. 17, 1950 |
| 2,495,292 | Scott | Jan. 24, 1950 |
| 2,500,599 | Bergsteinsson | Mar. 14, 1950 |
| 2,555,927 | Himel | June 5, 1951 |